(12) United States Patent
Kolar Sundar et al.

(10) Patent No.: US 9,015,484 B2
(45) Date of Patent: Apr. 21, 2015

(54) SYMMETRIC KEY DISTRIBUTION FRAMEWORK FOR THE INTERNET

(71) Applicant: Intel Corporation, Santa Clara, CA (US)

(72) Inventors: Divya Naidu Kolar Sundar, Hillsboro, OR (US); Prashant Dewan, Hillsboro, OR (US); Men Long, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/953,594

(22) Filed: Jul. 29, 2013

(65) Prior Publication Data

US 2013/0311777 A1    Nov. 21, 2013

Related U.S. Application Data

(63) Continuation of application No. 11/957,184, filed on Dec. 14, 2007, now Pat. No. 8,532,303.

(51) Int. Cl.
*H04L 29/06* (2006.01)
*H04L 9/08* (2006.01)

(52) U.S. Cl.
CPC ............ *H04L 63/0428* (2013.01); *H04L 9/083* (2013.01); *H04L 63/062* (2013.01); *H04L 63/20* (2013.01)

(58) Field of Classification Search
CPC ......... H04L 9/08; H04L 9/0866; H04L 9/088; H04L 9/3231
USPC ............................ 380/277–281; 713/168, 179
See application file for complete search history.

(56) References Cited

U.S. PATENT DOCUMENTS

| | | | |
|---|---|---|---|
| 6,158,011 A | 12/2000 | Chen et al. | |
| 6,834,301 B1 | 12/2004 | Hanchett | |
| 6,965,928 B1 | 11/2005 | Cox et al. | |
| 7,162,649 B1 | 1/2007 | Ide et al. | |

(Continued)

FOREIGN PATENT DOCUMENTS

| | | |
|---|---|---|
| CN | 1703889 A | 11/2005 |
| EP | 1873668 A1 | 1/2008 |

(Continued)

OTHER PUBLICATIONS

Notice on Grant received for Chinese Patent Application No. 200810190987.2, mailed on Aug. 6, 2013, 4 pages of Notice on Grant including 2 pages of unofficial English translation.

(Continued)

*Primary Examiner* — Joseph P Hirl
*Assistant Examiner* — Thomas Gyorfi
(74) *Attorney, Agent, or Firm* — Barnes & Thornburg LLP

(57) ABSTRACT

A method, device, and system are disclosed. In one embodiment the method includes receiving measured health information from a client on a key distribution server. Once the measured health information is received the server is capable of validating the measured health information to see if it is authentic. The server is also capable of sending a session key to the client when the measured health information is validated. When the client receives the session key, the client is capable of initiating an encrypted and authenticated connection with an application server in the domain using the session key.

20 Claims, 2 Drawing Sheets

(56) References Cited

U.S. PATENT DOCUMENTS

| | | | |
|---|---|---|---|
| 7,165,175 | B1 | 1/2007 | Kollmyer et al. |
| 7,234,063 | B1 | 6/2007 | Baugher et al. |
| 8,532,303 | B2 | 9/2013 | Sunder et al. |
| 2003/0065942 | A1 | 4/2003 | Lineman et al. |
| 2003/0140257 | A1 | 7/2003 | Peterka et al. |
| 2004/0039924 | A1 | 2/2004 | Baldwin et al. |
| 2004/0103310 | A1 | 5/2004 | Sobel et al. |
| 2004/0107360 | A1 | 6/2004 | Herrmann et al. |
| 2005/0131997 | A1 | 6/2005 | Lewis et al. |
| 2005/0138204 | A1 | 6/2005 | Iyer et al. |
| 2005/0172142 | A1 | 8/2005 | Shelest et al. |
| 2005/0273853 | A1 | 12/2005 | Oba et al. |
| 2006/0010485 | A1 | 1/2006 | Gorman |
| 2006/0047944 | A1 | 3/2006 | Kilian-Kehr |
| 2006/0085850 | A1 | 4/2006 | Mayfield et al. |
| 2006/0161791 | A1 | 7/2006 | Bennett |
| 2006/0277185 | A1 | 12/2006 | Sato et al. |
| 2007/0124471 | A1* | 5/2007 | Harada et al. .......... 709/225 |
| 2009/0154708 | A1 | 6/2009 | Kolar Sunder et al. |
| 2009/0307488 | A1 | 12/2009 | Guarraci et al. |

FOREIGN PATENT DOCUMENTS

| | | |
|---|---|---|
| JP | 2004511931 A | 4/2004 |
| JP | 2005065305 A | 3/2005 |
| JP | 2006134312 A | 5/2006 |
| JP | 2006253888 A | 9/2006 |
| JP | 2006338587 A | 12/2006 |
| WO | 2006034201 A2 | 3/2006 |

OTHER PUBLICATIONS

"Symantec Gateway 5420," May 13, 2007, <http://techrepublic.com.com/5208-6230-0.html?forumID=101&threadID=222392&messageID=2233027>, 2 pages.

SignaCert, Inc., "The Trusted Reference: An Invaluable Tool for IT Administration," Feb. 2007, available <http://japan.signacert.com/content/japanese/Trusted_Reference_JA.pdf>, 16 pages.

Tomur et al., "A Wireless Secure Remote Access Architecture Implementing Role Based Access Control: WiSeR," World Academy of Science, Engineering, and Technology, Issue No. 18, 2006, <http://www.waset.org/journals/waset/v18/v18-169.pdf>, pp. 58-63.

Cisco Systems, "Network Admission Control (NAC)," 2005, retrieved from http://www.cisco.com/en/US/solutions/collateral/ns340/ns394/ns171/ns466/ns617/net_presentation0900aecd80102f1b.pdf on Apr. 17, 2008, 44 pages.

Davies, "Network Access Protection Platform Overview," Microsoft TechNet, The Cable Guy, Jul. 2005, retrieved from http://technet.microsoft.com/en-us/library/bb878083.aspx on Apr. 17, 2008, 5 pages.

Cisco Systems, "Implementing Network Admission Control Phase One Configuration and Deployment," 2004, <http://web.archive.org/web/20040809000958/cisco.com/application/pdf/en/us/guesUnetsol/ns466/c654/cdccont_0900aecd800fdd7b.pdf>, 88 pages.

Aboba et al., "RFC 3748: Extensible Authentication Protocol (EAP)," Jun. 2004, <http://tools.ietf.org/pdf/rfc3748.pdf>, 68 pages.

Knudsen, "MOP Application Security 2: Understanding SSL and TLS," Oct. 2002, <http://developers.sun.com/jsp_utils/PrintPage.jsp?url=http%3A%2F%2Fdevelopers.sun.com%2Fmobility%2Fmidp%2Farticles%2Fsecurity2%2F>, 4 pages.

Dierks et al., "RFC 2246: The TLS Protocol, Version 1.0," Jan. 1999, <http://tools.ietf.org/pdf/rfc2246.pdf>, 81 pages.

Kent et al, "RFC 2401: Security Architecture for the Internet Protocol," Nov. 1998, <http://tools.ietf.org/pdf/rfc2401.pdf>, 67 pages.

Schneier, "Applied Cryptography, 2nd Edition," Published by John Wiley & Sons Inc., 1996, pp. 31-34 and 47-52.

Decision for Grant received for Japanese Patent App. No. 2012-096711, mailed Jul. 16, 2013, 3 pages of Japanese Decision for Grant.

Office Action received for Chinese Patent App. No. 200810190987.2, mailed Mar. 21, 2013, 3 pages of Chinese Office Action and 5 pages of unofficial English translation.

Office Action received for Chinese Patent App. No. 200810190987.2, mailed Nov. 20, 2012, 4 pages of Chinese Office Action and 6 pages of unofficial English translation.

Office Action received for Chinese Patent App. No. 200810190987.2, mailed Jul. 2, 2012, 8 pages of Chinese Office Action and 7 pages of unofficial English translation.

Decision for Grant received for Japanese Patent App. No. 2008-307458, mailed Mar. 21, 2012, 3 pages of Japanese Decision for Grant.

Decision to Grant received for European Patent App. No. 08253837.2, mailed Sep. 29, 2011, 2 pages.

Office Action received for Japanese Patent App. No. 2008-307458, mailed Jul. 12, 2011, 3 pages of Japanese Office Action and 4 pages of unofficial English translation.

Office Action received for Chinese Patent App. No. 200810190987.2, mailed Jul. 4, 2011, 4 pages of Chinese Office Action and 6 pages of unofficial English translation.

Rule 71(3) Communication received for European Patent App. No. 08253837.2, mailed Apr. 28, 2011, 20 pages.

Official Communication received for European Patent App. No. 08253837.2, mailed Jul. 29, 2009, 3 pages.

European Search Report received for European Patent App. No. 08253837.2, mailed May 25, 2009, 3 pages.

* cited by examiner

SYMMETRIC KEY DISTRIBUTION FRAMEWORK FOR THE INTERNET

CROSS-REFERENCE TO RELATED U.S. PATENT APPLICATION

This application is a continuation application of U.S. application Ser. No. 11/957,184, entitled "SYMMETRIC KEY DISTRIBUTION FRAMEWORK FOR THE INTERNET," filed Dec. 14, 2007.

FIELD OF THE INVENTION

The invention relates to the constant and dynamic distribution of symmetric keys from a dedicated key distribution server to clients across the Internet.

BACKGROUND OF THE INVENTION

The World Wide Web is fundamentally a client/server application running over the Internet. Security threats in the Internet have been increasing exponentially over the years. One way to classify the various security threats is in terms of location of the threat: web server, client web browser, and the traffic between the client web browser and the server. Considering the traffic between the client and the server, it is easy to deploy Internet Engineering Task Force (IETF) Internet Protocol Security (IPSec) and TLS (Transport Layer Security)-based network security protocols which depend on negotiating session keys between clients and servers using expensive asymmetric key cryptography (e.g. Diffie-Hellman). The servers have to keep track of tens of thousands of transient symmetric keys negotiated on a per-session basis. The result is that memory fetches for security associations for performing the cryptographic operations for these protocols in hardware becomes prohibitively expensive due to the amount of state that must be maintained (not to mention the costs of key negotiation).

BRIEF DESCRIPTION OF THE DRAWINGS

The present invention is illustrated by way of example and is not limited by the drawings, in which like references indicate similar elements, and in which.

DETAILED DESCRIPTION OF THE DRAWINGS

Embodiments of a method, device, and system to distribute symmetric keys from a server to clients across the Internet are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
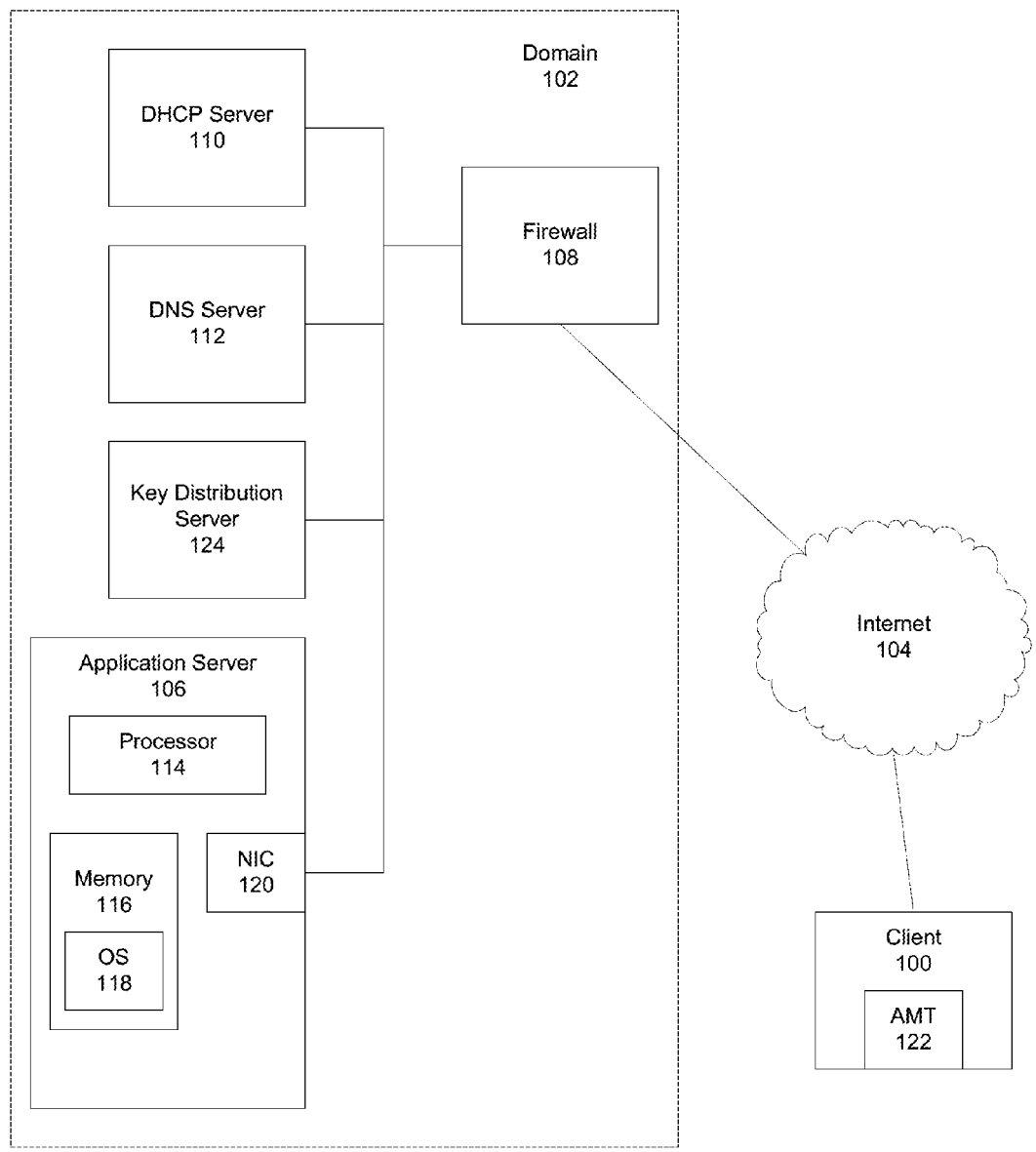
FIG. 1 describes a device and system for symmetric key distribution across the Internet.

FIG. 1 describes a device and system for symmetric key distribution across the Internet. In many embodiments, a client 100 is connected to a domain 102 through the Internet 104. The Internet is a worldwide, publicly accessible series of interconnected computer networks that transmit data using protocols such as the standard Internet Protocol (IP). More specifically, the Internet is a "network of networks" that consists of millions of smaller domestic, academic, business, and government networks that together carry various information and services. Physically, the Internet includes wired, optical, and wireless network backbones that comprise the medium over which information is transmitted.

In different embodiments, the client may be a desktop computer, a laptop computer, a mobile wireless device, a cellular phone, a set top box for a television, or any other type of computing device that has the capability of connecting to the Internet. The client's connection to the Internet may be through mechanisms such as routers, switches, access points, among other devices that connect individual devices to the Internet.

In different embodiments, the domain may be a domain for a business, a scientific institution, a university, a government office, an individual person's network, among others. The domain consists of one or more computer system servers that perform a number of functions which allow information to pass between the computers and users within the domain and the Internet. Each domain has a domain name that maps to a specific IP address.

FIG. 1 illustrates one example of a number of servers that perform vital functions within the domain. In different embodiments, these servers may be physically separate machines or they may be applications running on a single machine (e.g. in different partitions on the machine).

The client may request access to the domain 102 for services. In many embodiments, an application server 106 located within the domain provides one or more of these services that the client 100 desires (e.g. information storage service, news retrieval service, email service, etc.)

In many embodiments, the domain 102 has a firewall 108. The firewall 108 is a form of security that attempts to prevent malicious users and programs from entering the domain from the Internet 104. The firewall 108 may be a separate server (shown) or it may be part of one of the other servers in FIG. 1 (not shown).

The domain also includes a DHCP (dynamic host configuration protocol) server 110. Presuming the client 100 is DHCP-configured, when the client 100 connects to the domain 102, the DHCP client program in the client 100 sends a broadcast query requesting necessary information from the DHCP server 110. The DHCP server 110 manages a pool of IP addresses and information about client configuration parameters such as the domain name, the default gateway, among others. Additionally, the DHCP server 110 has information about the presence and address of a DNS (domain name system) server 112 located in the domain 102. Upon receipt of a valid request from the client 100, the DHCP server 110 will assign the client 100 an IP address and other parameters.

The client 100, now configured with an IP address received from the DHCP server 110 and the address of the DNS server 112, can now interact with the DNS server 112. The DNS server 112 provides IP addresses of servers and other devices within the domain 102.

Returning to the application server 106, one or more processors 114 are present on the application server 106. In different embodiments, each of these processors may be single or multi-core. Thus, in some embodiments the application server is a multi-processor, multi-core server and in other embodiments, the application server is a single-processor, single-core server, and in yet other embodiments, the application server is some derivative of a combination of the above described single/multi-processor, single/multi-core systems. In further embodiments, there may be more than one application server present for additional services or the same service may be distributed among multiple application servers to balance the client load. Many of the above described processor and server configurations are not shown in FIG. 1 because a single processor on a single server provides an adequate embodiment to describe the client/server situation.

Furthermore, the application server 106 also includes system memory 116 to store current instantiations of one or more operating systems, such as operating system (OS) 118. In normal operations, the processor 114 in application server 106 may service a number of requests from clients on the Internet 104, such as client 100. After going through the routing procedures with the DHCP server 110 and the DNS server 112, the client normally interacts with the application server 106 to gain access to the application server's services.

Although, in many embodiments, the application server 106 may have one or more health policies it requires of any client it interacts with. For example, there may be a minimum required health level that a client must surpass before it is granted access to interact with the application server 106. These health levels may be predetermined or determined dynamically depending on the environment. If the health level is not met by a client, a network interface controller (NIC) 120 may drop packets from that client. The NIC 120 is a hardware interface that handles and allows the application server 106 access to the internal computer network within the domain.

To securely determine the client health, in many embodiments, an Intel® Active Management Technology (AMT) device 122 or another independent security measurement device that performs similarly to the AMT is present within the client 100. In some embodiments, the AMT 122 may measure the health of the client system. This measurement may include information such as the software installed on the client, the operating system installed on the client, the version of antivirus software installed on the client, and how recent and how many attacks has the client system handled among other items of information. Logic within the AMT 122 may gather this information, or logic elsewhere within the client 100 may gather the health information and the AMT 122 may verify the authenticity of the health information. Once this health information is gathered, AMT 122 may sign the health information with a secure digital certificate. The client 100 may then send the secure health information across the Internet 104 to the domain 102.

In many embodiments, once the client 100 has initially received the IP address of the application server 106, the client 100 requests the health policy requirements from the application server 106 to see what requirements are necessary to interact with the application server 106. In many embodiments, a resolver program running on client 100 looks up the required client health policy on the application server 106. This request may be handled directly by the NIC 120. The NIC 120 may store health policy information associated with the application server 106 it resides within and can service the health policy requests from any client so no initial request load requires direct interaction with the processor 114, memory 116, or OS 118.

In addition to the health policy requirements for clients, the resolver program, after performing a client health policy look up on the application server, may also notify the requesting client that the domain 102 includes a key distribution server (KDS) 124 or multiple KDS's. This information would be obtained by the resolver program during the look up. The KDS 124 is capable of validating the health information received from clients. Once validated, the KDS 124 can provide the client with a client-specific session key for secure interaction with the application server 106. It is presumed that the KDS 124 in domain 102 is trusted by application server 106.

The NIC 120 in the application server may be provided by the KDS 124 with the master key for session key generation. For example, once the KDS 124 has authenticated the health of the client, the KDS can generate a master key for a session between the client 100 and the application server 106. The KDS 124 sends a session key, which is generated from the client ID information and the master key, to the client 100.

In some embodiments, the session key is sent to the client using SSL (Secure Sockets Layer) protocol. In other embodiments, the session key is sent to the client using TLS (Transport Layer Security) protocol. The TLS and SSL protocols allow for private communications across a network in a way designed to prevent eavesdropping, tampering, and message forgery. These protocols provide endpoint authentication and communications privacy over the Internet using cryptography.

The KDS 124 also and sends the master key to the NIC 120 in the application server 106. Using the session key received from KDS 124, the client can now establish an encrypted and authenticated connection with the application server. The client can then send encrypted packets to the application server 106 using an IPSec (Internet Protocol Security) packet format. The IPSec packet header format includes a security parameter index (SPI) field which has the client's ID information.

Once the NIC 120 receives an IPSec packet from the client 100, logic within the NIC 120 verifies the client ID within the SPI, and, using the master key received from the KDS 124, generates the server side of the symmetric key using a key function such as:

session key=f(master key, client SPI)

Once the NIC 120 version of the session key is generated, the NIC 120 can decrypt the packet from the client 100 and send the decrypted packet to the network software stack within the application server 106 so that the processor 114 and OS 118 can service the packet.

In some embodiments, if the decryption of the packet is not successful, the NIC 120 can drop the packet. This will eliminate any overhead performed by the processor 114 since the processor 114 would never see the packet.

Thus, utilizing the system and a KDS device described above, KDS may perform most, if not all, of the cryptographic key distribution operations, thus removing this significant workload from the application server 106. Additionally, the processor 114 and OS 118 residing on the application server 106 are further removed from decryption work because the NIC 120 is independently capable of decrypting the incoming packets and sending the decrypted packets along to the network stack residing in the application server 106 software.

In many embodiments, there are multiple distributed KDSs in the domain 102. Multiple KDSs may provide benefits such as balancing the load of key distribution to many clients as well as providing added security by distributing the functionality of the KDS so an attack to any one server would not be able to circumvent the key distribution system. Any general distributed server load balancing algorithm may be utilized to balance the load between the multiple KDSs. For example, the resolver program within the client 100, after performing a DNS look up for the KDS by interacting with the DNS server 112, can apply a load balancing algorithm to the returned IP address of the KDS. This may send the client key request to any one of many KDSs present in the domain.

Furthermore, in many embodiments, the NIC 120 may inform the KDS 124 when one or more abnormal situations occur with incoming client packets. The KDS 124 may take appropriate actions regarding one or more clients when it is informed of this abnormal behavior from the NIC 120. For example, the KDS 124 may save a revocation list for keys and/or clients. Thus, if the NIC 120 informs the KDS 124 when it sees packets containing the same client ID but different IP addresses, then the KDS 124 may put the key associated with the client ID into the revocation list and distribute a new key to the client. If the NIC 120 informs the KDS 124 that this new key is again being utilized by multiple clients, the client that requested the key may be put into the revocation list to permanently deny that client further communication with any servers on the network.

In many embodiments, health information the KDS 124 receives from a client might also be piggybacked with other client information, including the client's capabilities and potential roles (i.e. posture information). The KDS 124 may utilize this additional information to decide which servers within the domain 102 the client will be allowed to communicate with. Thus, the KDS 124 may send a set keys used to communicate with this determined set of servers.

Figure 2:
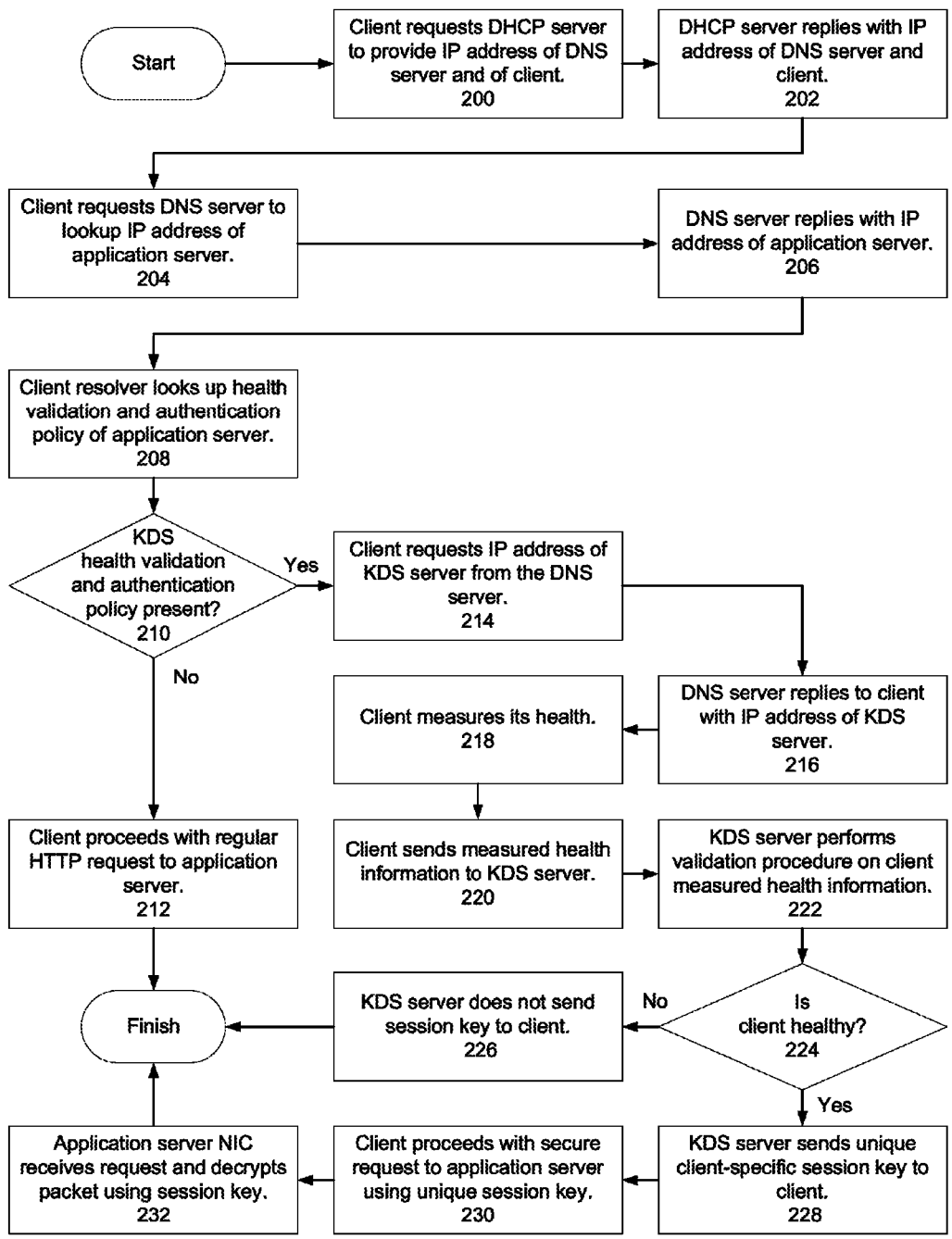
FIG. 2 is a flow diagram of one embodiment of a process to distribute key information using a key distribution server.

FIG. 2 is a flow diagram of one embodiment of a process to distribute key information using a key distribution server. The process may be performed by hardware, software, or a combination of both. The process begins by processing logic in a client machine requesting a DHCP server in a domain to provide the IP address of the DNS server in the domain and also an IP address for the client (processing block 200). Then processing logic within the DHCP server replies with the IP address of the DNS server and the client (processing block 202).

The process continues with processing logic within the client requesting the DNS server to lookup the IP address of an application server in the domain (processing block 204). Then processing logic within the DNS server replies with the IP address of the application server (processing block 206). Processing logic within a client resolver program then, using the IP address of the application server, polls the application server to look up the health validation and authentication policy of the application server (processing block 208).

The results of the client resolver policy lookup in the application server are then determined by processing logic (processing block 210). If the application server does not have a policy present, then processing logic within the client proceeds with a regular HTTP request to the application server (processing block 212).

Otherwise, if a health validation/authentication policy is present, then processing logic knows a KDS server is present in the domain. Thus, processing logic in the client requests the IP address of the KDS server from the DNS server (processing block 214). Next, the DNS server responds to the client with the IP address of the KDS server (processing block 216). Processing logic within the client then measures the client health (processing block 218). The health measurement may be done using an AMT device or another such device utilized to verify that the client machine is healthy and not compromised. Processing logic within the client then provides the health information and potentially other posture information to the KDS server (processing block 220).

Processing logic within the KDS server then performs a validation procedure on the client's measured health information (processing block 222). This validation procedure can be any one of a number of health requirement policies. This would be decided on a server by server basis based on the security level required for client access to the application server in the domain.

At this point, processing logic has determines the health of the client (processing block 224). If the client is deemed not healthy by the KDS server, then the KDS server does not send a session key to the client (processing block 226). Otherwise, if the client is deemed healthy by the KDS server, then the KDS server sends a unique session key (i.e. derivation key) to the client (processing block 228). When the client receives the key, processing logic within the client then proceeds with a secure request to the application server using the unique session key (processing block 230). Finally, processing logic within the application server NIC receives the secure request from the client and decrypts the packet using a session key derived from the client ID and a master key provided from the KDS (processing block 232). Once the packet is decrypted the packet can be sent to the network software stack for further processing within the application server and the process is finished.

Thus, embodiments of a method, device, and system to distribute symmetric keys from a server to clients across the Internet are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

The invention claimed is:

1. A key distribution server to generate a session key to secure communications with an application server, the key distribution server comprising:
   key distribution server hardware logic to:
   determine a first group of application servers of a plurality of application servers to be accessible to a client device;
   receive health information generated by a client device requesting access to an application server of the plurality of application servers, the health information describes the health of the client device based on a client health policy required to access the application server;
   determine whether the health of the client device meets the client health policy required to access each application server of the first group of application servers;
   generate a plurality of unique master keys for the first group of application servers in response to a determination that the health of the client device meets the client health policy required to access each application server, each master key corresponds to a different application server;
   provide the client device with a session key for secure interaction with the application server in response to a determination that the health of the client device meets the client health policy; and
   provide the application server with a master key that corresponds to the session key, wherein each unique master key is provided for each particular session key.

2. The key distribution server of claim 1, wherein the key distribution server hardware logic is further to:
   generate the session key as a function of the master key and a client identifier of the client device.

3. The key distribution server of claim 2, wherein to provide the application server with the master key that corresponds to the session key comprises to provide the application server with the master key for generation of a corresponding session key as a function of the master key and the client identifier of the client device.

4. The key distribution server of claim 1, wherein the key distribution server hardware logic is further to:
receive information indicative of abnormal communications by the client device;
add the session key provided to the client device to a key revocation list;
generate a new session key; and
provide the new session key to the client device for secure interaction with the application server.

5. The key distribution server of claim 4, wherein to receive information indicative of abnormal communications by the client device comprises to receive information from the application server indicative of abnormal communications by the client device.

6. The key distribution server of claim 1, wherein the key distribution server hardware logic is further to:
receive information indicative of abnormal communications by the client device;
add the client device to a revocation list; and
prevent the client device from further interactions with the application server.

7. The key distribution server of claim 1, wherein the health information generated by the client device further comprises information indicative of one or more capabilities of the client device; and
wherein the key distribution server hardware logic is further to:
generate a plurality of session keys, each session key corresponding to a client identifier of the client device and a different master key of the plurality of master keys;
send a first master key of the plurality of master keys to a first application server for generation of a matching session key as a function of the first master key and the client identifier of the client device; and
send the corresponding session key to the client device for secure interaction with the first application server.

8. A non-transitory machine readable medium comprising a plurality of instructions stored thereon that in response to being executed by a key distribution sever, cause the key distribution sever to:
determine a first group of application servers of a plurality of application servers to be accessible to a client device;
receive health information generated by a client device requesting access to an application server of the plurality of application servers, the health information describes the health of the client device based on a client health policy required to access the application server;
determine whether the health of the client device meets the client health policy required to access each application server of the first group of application servers;
generate a plurality of unique master keys for the first group of application servers in response to a determination that the health of the client device meets the client health policy required to access each application server, each master key corresponds to a different application server;
provide the client device with a session key for secure interaction with the application server in response to a determination that the health of the client device meets the client health policy; and
provide the application server with a master key that corresponds to the session key, wherein each unique master key is provided for each particular session key.

9. The non-transitory machine readable medium of claim 8, wherein the plurality of instructions further cause the key distribution server to:
generate the session key as a function of the master key and a client identifier of the client device.

10. The non-transitory machine readable medium of claim 9, wherein to provide the application server with the master key that corresponds to the session key comprises to provide the application server with the master key for generation of a corresponding session key as a function of the master key and the client identifier of the client device.

11. The non-transitory machine readable medium of claim 8, wherein the plurality of instructions further cause the key distribution sever to:
receive information indicative of abnormal communications by the client device;
add the session key provided to the client device to a key revocation list;
generate a new session key; and
provide the new session key to the client device for secure interaction with the application server.

12. The non-transitory machine readable medium of claim 11, wherein to receive information indicative of abnormal communications by the client device comprises to receive information from the application server indicative of abnormal communications by the client device.

13. The non-transitory machine readable medium of claim 8, wherein the plurality of instructions further cause the key distribution sever to:
receive information indicative of abnormal communications by the client device;
add the client device to a revocation list; and
prevent the client device from further interactions with the application server.

14. The non-transitory machine readable medium of claim 8, wherein the health information generated by the client device further comprises information indicative of one or more capabilities of the client device; and
wherein the plurality of instructions further cause the key distribution server to:
generate a plurality of session keys, each session key corresponding to a client identifier of the client device and a different master key of the plurality of master keys;
send a first master key of the plurality of master keys to a first application server for generation of a matching session key as a function of the first master key and the client identifier of the client device; and
send the corresponding session key to the client device for secure interaction with the first application server.

15. A client device to securely communicate with an application server, the client device comprising:
processing logic to: (i) request, from an application server, a client health policy required to access the application server and (ii) send health information to a key distribution server for validation, the health information describes the health of the client device; and
a security management component to perform a health check of the client device as a function of the client health policy required to access the application server, the health check to generate the health information that describes the health of the client device;
wherein the processing logic is further to receive a session key from the key distribution server for secure interaction with the application server in response to validation of the health information, the session key is a cryptographic key generated as a function of a client identifier of the client device and a master key, the master key is a unique master key of a plurality of unique master keys generated by the key distribution server for a group of application servers in response to a determination that that the health of the client device meets the client health policy required to access each application server, and each master key corresponds to a different application server.

16. The client device of claim 15, wherein the security management component further to sign the health information with a secure digital certificate; and
wherein to send the health information to the key distribution server for validation comprises to send the signed health information over a network to the key distribution server.

17. The client device of claim 15, wherein the processing logic is further to:
receive the client health policy from the application server;
encrypt a packet using the session key; and
send the encrypted packet to the application server using an Internet Protocol Security (IPSec) packet, the IPSec packet comprises the encrypted packet and a client identifier of the client device.

18. A non-transitory machine readable medium comprising a plurality of instructions stored thereon that in response to being executed by a client device, cause the client device to:
request, from an application server, a client health policy required to access the application server;
send health information to a key distribution server for validation, the health information describes the health of the client device;
perform a health check of the client device as a function of the client health policy required to access the application server, the health check to generate the health information that describes the health of the client device; and
receive a session key from the key distribution server for secure interaction with the application server in response to validation of the health information;
wherein the session key is a cryptographic key generated as a function of a client identifier of the client device and a master key, the master key is a unique master key of a plurality of unique master keys generated by the key distribution server for a group of application servers in response to a determination that that the health of the client device meets the client health policy required to access each application server, and each master key corresponds to a different application server.

19. The non-transitory machine readable medium of claim 18, wherein the plurality of instructions further cause the client device to sign the health information with a secure digital certificate; and
wherein to send the health information to the key distribution server for validation comprises to send the signed health information over a network to the key distribution server.

20. The non-transitory machine readable medium of claim 18, wherein the plurality of instructions further cause the client device to:
receive the client health policy from the application server;
encrypt a packet using the session key; and
send the encrypted packet to the application server using an Internet Protocol Security (IPSec) packet, the IPSec packet comprises the encrypted packet and a client identifier of the client device.

* * * * *